July 18, 1939.     S. J. STRID     2,166,614
COTTER PIN
Filed July 18, 1938
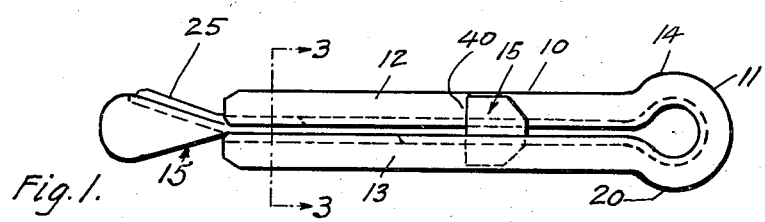
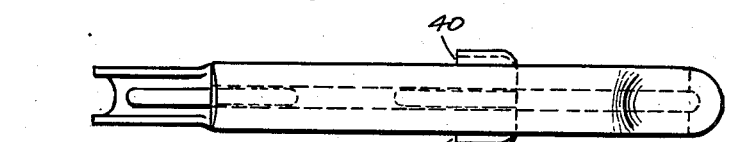
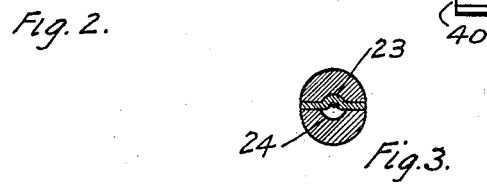
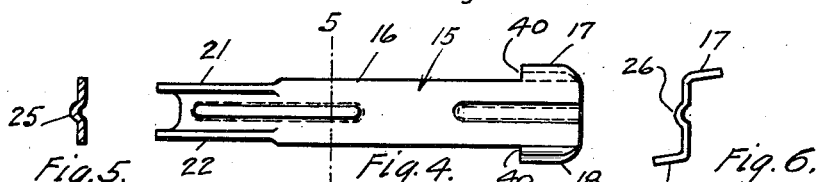
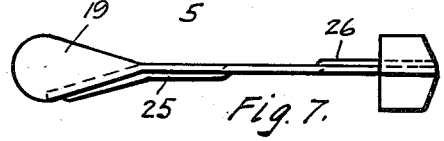
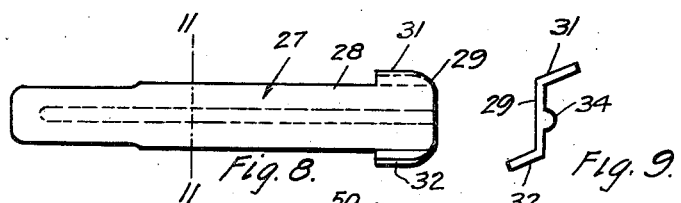
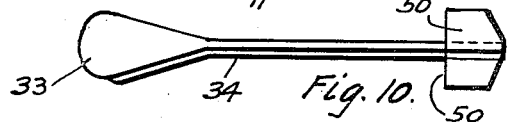
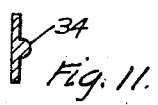
INVENTOR.
SVEN J. STRID
BY Manny Brown & Co.
ATTORNEYS.

Patented July 18, 1939

2,166,614

UNITED STATES PATENT OFFICE 2,166,614

COTTER PIN

Sven J. Strid, Chicago, Ill., assignor to T & S Corporation, Chicago, Ill., a corporation of Illinois Application July 18, 1938, Serial No. 219,903

8 Claims. (Cl. 85—8.5)

This invention relates to cotter pins and more particularly to the self-locking type.

One object of the invention is the provision of a new and improved combined cotter pin and spreader member having novel means for retaining the spreader member in parallelism with the arms of the cotter pin.

Another object of the invention is the provision of a new and improved cotter pin construction including novel means for interlocking the parts together.

A further object of the invention is the provision of a cotter pin having a new and improved spreader member provided with elongated novel means for engaging the arms of the pin for preventing angular movement of the spreader member relative to the arms of the pin.

Another object of the invention is the provision of a new and improved cotter pin and spreader member that is easily assembled, inexpensive to manufacture, efficient in use and that may be readily applied.

Other and further objects and advantages of the invention will appear from the following description, taken in connection with the accompanying drawing, in which Fig. 1 is a side view of a cotter pin and spreader member in assembled relation;

Fig. 2 is a top plan view of Fig. 1;

Fig. 3 is a section on the line 3—3 of Fig. 1;

Fig. 4 is a top plan view of the spreader member;

Fig. 5 is a section on the line 5—5 of Fig. 4;

Fig. 6 is an end view of the spreader member looking from the right in Fig. 4;

Fig. 7 is a side elevation of the spreader member showing the same turning through 90° from that disclosed in Fig. 4;

Fig. 8 is a top plan view of a modified form of spreader member;

Fig. 9 is an end view thereof looking toward the left of the construction shown in Fig. 8;

Fig. 10 is a side elevation of the spreader member shown in Fig. 8 showing the spreader member turned through 90° from that shown in Fig. 8; and Fig. 11 is a section on the line 11—11 of Fig. 8.

Referring now to the drawing, the reference character 10 designates a cotter pin which is made in the conventional manner by bending half round stock back on itself to form the body portion 11 and the arms 12 and 13. The body portion is in the form of a loop having the arms offset inwardly to form what may be termed stops or shoulders 14 and 20, as is usual in such constructions. The pin is of the conventional type in contour.

Suitable means are provided for spreading the outer ends of the arms 12 and 13 when the cotter pin is driven home in a hole in a bolt for locking the pin in position in the hole, thus preventing the removal of the bolt, as is well known in the art.

In the form of the construction selected to illustrate one embodiment of the invention, a spreader member 15 is employed for this purpose. This spreader member may be a stamping, as shown in Figs. 1 to 7, or it may be cast or forged, as shown in Figs. 8 to 11.

As shown in Figs. 1 to 3, the spreader member comprises a thin, flat body portion 16, the inner end of which is provided with laterally extending wings 17 and 18 which provide abutting shoulders 40 for limiting the outward movement of the spreader member when the pin is forced to its holding position in the bolt. The wings 17 and 18 may be bent at an angle, if desired, for assisting in holding the inner end of the spreader member in position between the arms 12 and 13 of the cotter pin. The outer end of the spreader member 15 is formed into a wedge-like projection or wedge member 19.

The wedge member 19 may be formed in any suitable manner. In the construction shown, it may be formed by bending wings 21 and 22 having inclined outer edges at right angles to the body portion of the spreader in the manner disclosed in the patent to Taylor, No. 1,768,721, July 1, 1930.

It is highly desirable that means be provided for holding the spreader member between the arms 12 and 13 of the cotter pin so that the longitudinal axis of the spreader member will be held parallel with the longitudinal axis of the cotter pin or be coincident therewith, as shown in Figs. 1 and 2 of the drawing. This is accomplished by providing means extending longitudinally of the spreader member for a portion of its length. Such means engages the pin in such a manner as to prevent angular movement of the spreader relative to the arms of the pin.

In the form of the construction shown in Figs. 1 to 7, which is by way of example only, the spreader member is of sheet metal and may be provided with one or more ribs extending laterally from one or both sides for engaging grooves 23 and 24 in the adjacent or flat sides of the arms 12 and 13. The grooves 23 and 24 may be formed in the arms 12 and 13 in any suitable manner but preferably, the stock is rolled with the groove therein so that when the pin is formed, there will be one continuous groove around the inner side of the arm and the loop 11 and these groove sections on the arms will register with each other to form an elongated recess for receiving said ribs or corrugations, as shown in Fig. 3.

In the form of the construction shown in Figs. 1 to 7, the spreader member 15 is provided at its outer end on one of its faces with a bead, rib, or corrugation 25 which extends along one side of the wedge and the outer end of the body portion of the spreader. On the opposite side of the spreader member, there may also be provided a short corrugation or rib 26 extending outwardly from the inner end of the spreader member, Figs. 6 and 7. The spreader member 15, being of sheet metal, the ribs may be stamped on the member in one operation since the rib 25 is on one side at one end and the rib 26 is on the other side at the opposite end. In other words, the ribs are staggered longitudinally of the spreader member. If desired, only one elongated rib or corrugation may be employed for engaging in either the groove 23 or 24. Such a construction is shown in Figs. 8 to 11. In this form of construction, the spreader member is shown as being forged or cast but this is immaterial as the sheet metal type may also be pressed with only one rib.

As disclosed in Figs. 8 to 11, the spreader member 27 comprises a body portion 28, an inner end portion 29 having the laterally extending wings 31 and 32 forming shoulders or limiting stops 50 which may extend at an angle to the end portion 29, as shown in Fig. 9. The outer end of the spreader member is in the form of a wedge 33 which is similar to the wedge 19 in the previous construction. A rib 34 is provided that is considerably elongated. As shown, it extends substantially the full length of the spreader member on one side thereof. This rib is adapted to engage either the recess 23 or the recess 24 of the pin and holds the parts in assembled relation thereby preventing angular movement of the spreader member relative to the arms of the pin.

In assembling the device, the arms are spread slightly apart and the spreader member inserted between the same with the ribs or corrugations engaging in the recesses 23 and 24.

The cotter pin is used in the manner disclosed in the Taylor patent noted above, that is, the outer end of the pin is inserted in an opening in a bolt or other member until the wing members 17 and 18, or 31 and 32, which form shoulders, come in contact with the bolt or other member through which the pin extends, after which the inner end of the pin is struck with a hammer and forced outwardly, causing the outer ends of the arms to ride upon the wedge thus spreading the arms apart and causing them to take a permanent set for preventing the removal of the pin.

It will thus be seen that in both forms of construction, there is provided a spreader member having means for contacting one or both of the arms of the cotter pin and that this means is elongated for engaging at least one of said arms for a material distance along the same so as to prevent angular movement of the spreader member relative to the arm.

While the interengaging connection between the spreader member and the arms of the pin is shown as what might be termed a sliding tongue and groove connection along the central portion of the arms and spreader member, it is understood that the interengaging connection may be at either side of the center lines of these elements.

It is thought from the foregoing, taken in connection with the accompanying drawing, that the operation and construction of my device will be apparent to those skilled in the art and that changes in size, shape, proportion or detail may be made without departing from the spirit and scope of the appended claims.

I claim as my invention:

1. A self-locking cotter pin comprising a pair of substantially parallel arms connected together by a loop portion at their inner ends, one of said arms having a groove on its inner face, a spreader member having a body portion extending between said arms outwardly of said loop portion, said member having a wedge portion on one end and a shoulder on its other end portion extending laterally beyond the periphery of said arms, and said body portion having a rib for engaging in said groove for holding said member parallel with said arms, the interengaging surfaces of said rib and groove remaining parallel in all relative positions of said pin and spreader member.

2. A self-locking cotter pin comprising a pair of substantially parallel arms connected together by a loop at their inner ends and a spreader member between the arms of said pin outwardly of said loop, said member having a laterally extending portion on one end portion forming a shoulder and a wedge element on its opposite end portion with the apex of the wedge pointing toward said shoulder, said wedge element extending outwardly beyond the ends of said arms when said pin is in inoperative position, and elongated means on said member between the side edges thereof for engaging said arms for holding said member parallel with said arms at all times.

3. A combined cotter pin and spreader member, comprising a cotter pin having two half-round substantially parallel arms connected together at their inner ends by a loop portion, a spreader member between said arms, a shoulder on said spreader member for engaging the apertured member in which said pin is inserted for limiting the movement of said spreader member for spreading the outer end of said arms when the same is driven home, and interengaging means between at least one of the arms and said member and extending a material distance along said arm for holding the axes of said arms and member parallel.

4. In a device of the class described, a cotter pin having a pair of substantially parallel arms connected together at their inner ends, a spreader member between said arms outwardly of the connected portion, said spreader member having a flat body portion, a wing extending laterally from one end of said spreader member to form a shoulder for limiting the movement of said spreader member, a wedge member on the outer end of said spreader member, and a sliding tongue and groove connection between said wedge and body portion and one of said arms.

5. A spreader member for a cotter pin comprising a flat body portion having laterally extending shoulders at its inner end and a wedge member at its opposite end, said body portion having corrugations extending lengthwise of the member on opposite sides thereof and arranged in staggered relation.

6. In combination, a cotter pin of conventional contour comprising a pair of arms connected together at their inner ends by a loop, said pin having a groove on the flat face of each arm extending longitudinally thereof, a sheet metal spreader member having a pair of laterally extending wings forming stops on its inner end between the ends of said pin and having its outer end bent to form a wedge member with the apex toward the arms of said pin, said spreader member having corrugations on opposite sides thereof in staggered relation for slidably engaging said grooves.

7. In combination, a cotter pin comprising a pair of substantially parallel arms connected together at their inner ends by an integral loop, said arms having flat faces on their adjacent sides, said pin having a groove on the flat face of each arm extending longitudinally thereof, a spreader member between said arms and located outwardly of said loop, said member having laterally extending shoulders on its inner end and having a solid wedge member on its outer end, projections on said spreader member for engaging said grooves for preventing angular movement of said spreader member relative to said arms, said grooves and projections engaging at all times throughout their entire lengths.

8. In combination, a cotter pin comprising a pair of arms connected together by an integral loop, a spreader member between and engaging said arms, an interengaging projection and groove connection between one of said arms and said spreader member for holding said spreader and arms in parallel relation, said projection and groove connection being located between said arms within opposite peripheral edges thereof, a wedge formation on the outer end of said spreader member tapering toward said loop for spreading the outer ends of said arms apart when said pin is moved toward the base of said wedge formation, and a projection on said spreader member extending laterally beyond the peripheral edges of said arms to form a shoulder for limiting the outward movement of said spreader member when said pin is applied.

SVEN J. STRID.